Nov. 5, 1968    C. E. JACKSON ETAL    3,409,139
ROTARY VACUUM FILTER DRUM AND SUCTION BOX ARRANGEMENT
Filed Sept. 3, 1965    9 Sheets-Sheet 1

INVENTORS.
CLIFFORD E. JACKSON
FERDINAND KRISTOFL
BY
*Theodore M. Jablon*
ATTORNEY.

Nov. 5, 1968  C. E. JACKSON ET AL  3,409,139
ROTARY VACUUM FILTER DRUM AND SUCTION BOX ARRANGEMENT
Filed Sept. 3, 1965  9 Sheets-Sheet 3

INVENTORS.
CLIFFORD E. JACKSON
FERDINAND KRISTOFL
BY
ATTORNEY.

Nov. 5, 1968  C. E. JACKSON ET AL  3,409,139
ROTARY VACUUM FILTER DRUM AND SUCTION BOX ARRANGEMENT
Filed Sept. 3, 1965  9 Sheets-Sheet 8

INVENTORS.
CLIFFORD E. JACKSON
FERDINAND KRISTOFL
BY
Theodore M. Jablon
ATTORNEY.

United States Patent Office 3,409,139
Patented Nov. 5, 1968

3,409,139
ROTARY-VACUUM FILTER DRUM AND
SUCTION BOX ARRANGEMENT
Clifford E. Jackson and Ferdinand Kristofl, Orillia, Ontario, Canada, assignors to Dorr-Oliver Incorporated, Stamford, Conn., a corporation of Delaware
Filed Sept. 3, 1965, Ser. No. 484,803
21 Claims. (Cl. 210—404)

ABSTRACT OF THE DISCLOSURE

A rotary drum filter which has a filter drum provided externally with axially directed drainage channels adjoining one another, and terminating in radially inwardly directed filtrate drainage openings cooperating with the arcuate suction opening of a stationary vacuum box in a vacuum filtration zone. A vacuum filtrate discharge conduit extends from a submerged discharge opening in the outer wall of the vacuum box through the adjacent end wall of the vat, so located as to provide cascading flow of the vacuum filtrate liquid downward from a low point of the filter drum.

---

This invention relates to continuous rotary drum filters wherein the driven rotary filter drum is partially immersed in a pulp bath in a vat. In the operation of such a filter, as the drum rotates, a layer or sheet of pulp material collected from the bath upon the filter media of the drum, emerges at the ascending side of the drum. Feed suspension or pulp is supplied continuously to the vat, so that the sheet may be delivered continuously from the filter drum, while separated filtrate liquid passes continuously from the drum.

More particularly, the invention relates to rotary drum filters of the type that may be employed advantageously for the de-watering and washing or re-washing of fibrous pulps, for example bleach pulp from the bleach towers, or the like. In such pulp treatment or washing operations great volumes or liquid or liquor must be handled by such filters also called pulp washers or thickeners which may be required to form sheets or layers of material on the filter media of the drum, having a moisture corresponding to a solids concentration of, say, 12% to 14% from a dilute feed pulp of perhaps only 0.35% to 1.0%.

Pulp filters embodying the invention employ a so-called deckle or sealing device which peripherally seals one open end of the filter drum against the pulp bath in the vat. Such a deckle sealing arrangement allows the filtrate liquid to gravitate from the ends of the longitudinal filtrate drainage chambers or channels arranged side by side about the filter drum, directly to a lower level of filtrate liquid maintained in the rotating drum, whence the filtrate will flow past the deckle sealing device directly through a stationary low level delivery connection provided in the adjacent transverse end wall of the vat.

It is among the objects of this invention to provide an improved continuous rotary drum filter or pulp washer which is simple of construction, readily accessible for inspection and maintenance, and which is furthermore economical in operation with respect to minimizing power requirements, friction losses and filtration head losses, internal filtrate flow resistance, and wear and tear, yet which is capable of efficient high capacity sheet formation delivering a well formed sheet of substantial thickness, which may be washed and well drained or dried along with a high degree of chemical recovery and furthermore which is readily adaptable to a variety of modifications in the filtrate cycle requirements.

According to the invention, the foregoing objects are attainable in a filtration cycle whereby sheet formation in the pulp bath is effected at the descending side of the filter drum in a preliminary zone of gravity filtration, followed by a filtration zone employing vacuum effects at the ascending side of the filter drum, and herein termed the vacuum filtration zone. Separate and specially constructed discharge conduit means are provided for this filtration zone.

In this way, the relatively mild gravity-filtration effect in the first zone will cause a porous or liquid-pervious layer of fibrous material to be initially formed on the filter drum adapted to prevent blinding of the filter media. Thereafter, additional sheet thickness will build up upon this porous base layer as the filter drum becomes exposed to the more intense vacuum effect in the next following filtration zone effective upon the pulp in the vat. Hence, there emerges from the pulp bath a sheet of a substantial total thickness and of a porosity or perviousness well suited for spray washing in a next following washing zone and for drainage or drying in a subsequent zone. Both of the last mentioned accessory zones in the filtration cycle may also be subjected to vacuum effect, before the sheet enters a final vacuum break and sheet discharge zone.

In view of the objects and for the purposes above set forth, the invention provides an improved filter unit or washer capable of performing in the above stated filtration cycle as well as capable of the above indicated versatility of operation.

In the improved machine of this invention the filter drum comprises a drum structure trunnion-mounted for rotation on a vat to which the feed suspension or pulp is continuously fed, and wherein the filter drum is partially immersed. The drum structure is formed outwardly with axially directed filtrate drainage channels adjoining one another and having at one end thereof radially inwardly directed drainage openings located in a common cylindrical sealing surface coaxial with the drum axis, and filter media tightly surrounding the drum structure and closing the drainage channels from end to end thereof. Deckle sealing means are provided adjacent to the drainage openings along the periphery of the drum structure so as to be sealingly effective between the drum structure and the adjacent transverse end wall of the vat. Suitable blocking means are provided for preventing the feed pulp in the vat from passing through the opposite end of the drum structure into the region of the drainage opening.

The improved machine comprises a stationary vacuum box of special construction having an arcuate suction opening communicating with a number of consecutive drainage openings to provide vacuum suction therefor during the rotation of the drum structure. The arcuate suction opening substantially conforms to the curvature of the surrounding cylindrical sealing surface of the filter drum having slightly radially spaced relationship therewith. Resilient sealing means provided along the edges of the suction opening establish sealing contact between the vacuum box and the surrounding sealing surface of the drum. Preferably, for mounting the vacuum box concentric with the drum, the vacuum box comprises a hub portion surrounding the adjacent drum trunnion and centered and supported thereby, with additional mounting means provided for securing the vacuum box against rotation relative to the vat. The special feature of supporting the vacuum box in this manner within the end portion of the filter drum, renders the combination insensitive to thermal expansion of the filter drum relative to vacuum box, thus maintaining the desired cooperative and sealing relationship between them unchanged. With this novel bearing arrangement for the vacuum box, the radially directed atmospheric forces acting upon the box due to the pressure differential are absorbed by the trunnion shaft, and will not be exerted upon the surrounding cylindrical sealing surface of the filter drum, thus minimizing frictional resistance and wear and tear.

The machine of this invention also features special filtrate discharge conduit means for the vacuum box, featuring a novel sealing arrangement effective between the vacuum box and the adjoining transverse end wall of the vat.

In a preferred embodiment involving the above stated operating cycle, the gravity filtration zone at the descending side of the drum and the vacuum filtration zone at the ascending side meet substantially at the low point or 6 o'clock position of the filter drum.

Other features of the invention lie in the special construction, mounting, and accessibility of the vacuum box, as well as in the versatility of its application to different operational requirements. According to a specific feature, the suction opening extends over an arc of more than 180°, while the vacuum box itself is functionally subdivided into vacuum receiving chambers for a vacuum filtration zone, a next higher spray washing zone, and a drainage and drying zone. All said three zones may be subject to vacuum effect from a single source or barometric leg.

Other features lie in the construction and arrangement of the edge sealing means for the vacuum box.

Other features lie in the details of a filter cycle and its mode of operation.

Other features lie in the construction of the filter drum.

Still other features and advantages will herein after appear.

The invention will now be described in connection with the attached drawings which illustrate the best mode for carrying out this invention as presently contemplated.

FIGS. 7a and 7b together represent an enlarged fragmentary and more detailed view of the filter unit of FIG. 2;

FIG. 7c shows modification of the trunnion bearing of FIG. 7a;

The drum filter herein shown to embody and illustrate the various aspects of this invention, comprises a filter drum 10 having end trunnions 11 and 12. The filter drum operates in a vat 13 to which the feed pulp or suspension 14 is continuously fed. The vat has transverse end walls 15 and 16 upon which are mounted trunnion bearings 17 and 18 for the filter drum. Drive means 19 at the rear bearing 17 rotate the filter drum which is partially immersed in the bath of pulp defined by the pulp level L in the vat.

As the drum is rotated in the direction of arrow R, a layer or sheet of pulp material 20 forms initially as a result of gravity filtration at the lower portion of the descending side of the drum, which layer is built up further to substantial thickness 21 in a subsequent vacuum filtration zone effective in the lower portion of the ascending side of the drum. The resulting pulp sheet thus emerging from the pulp bath with the rotation of the drum then passes through a spray washing vacuum zone, and then through a vacuum drainage and drying zone before the vacuum effect is broken and the sheet allowed to discharge over a discharge device 22, all as will be furthermore explained and described.

Vacuum suction effect for the aforementioned three vacuum zones is provided by a specially mounted and specially constructed vacuum box 23 fitted into, and surrounded by, and sealingly cooperating with the front end or filtrate drainage end of the filter drum, adjacent to end wall 16 of the vat. Accordingly, the vacuum box has a peripheral radially outwardly facing suction opening extending through an arc greater than 180° as indicated (see FIG. 1) by the obtuse angle X, and communicating with filtrate drainage openings 24 provided internally along the periphery of the filter drum. In this embodiment, the arcuate suction opening starts substantially at the low point or 6 o'clock position of the filter drum, terminating at a point intermediate the 12 o'clock and 3 o'clock positions. The vacuum box construction, its sealing relationship to the filter drum, as well as the manner or modes of its operation will be described in more detail below.

A deckle sealing device is provided at the filtrate drainage end of the filter drum, comprising a deckle or sealing element 27 of resiliently deformable material, arranged to seal the drainage end of the filter drum peripherally against the adjoining end wall 16 of the vat. The deckle element extends around and hugs an inner rim portion 28 extending inwardly from wall 16, confined between this inner rim portion and an outer rim portion 28a. The ends of the deckle element are anchored at points 29 and 30 (see FIG. 1) upon the vat. In this way, the deckle strap element is sealingly confined between the vat end wall and the filter drum, engaging an annular transverse terminal sealing face 31 of the drum. As herein illustrated the dackle element is in the form of a tubular element which may be supplied with pressure water as indicated at 27a, allowed to seep out through weep holes 27c for purging the interface between element 27 and the filter drum.

The deckle sealing device just described together with the adjacent end wall of the vat and with a transverse head plate 32 of the filter drum, provides a receiving space 33 open to the atmosphere, wherein gravity filtration liquid from the drainage openings 24 will collect from the aforementioned gravity filtration zone for delivery through a first discharge conduit 34 leading from the end wall 16 of the vat.

At the ascending side of the filter drum the receiving space 33 is occupied by the lower portion of the vacuum box 23, collecting vacuum filtration liquid from the aforementioned vacuum filtration zone. A second discharge conduit means 35 separately delivers vacuum filtrate from the vacuum box through the adjacent end wall 16 of the vat, comprising a barometric leg 36 of a length adapted to provide whatever degree of vacuum effect may be required.

In order that the vacuum box may be readily installed, dismounted or turned about the trunnion 12, a short transitional conduit portion 37 is provided connecting the vacuum box with the adjacent end wall of the vat, comprising a short neck 38 extending from the vacuum box and over which is fitted an annular sealing member or O-ring 39 of resiliently deformable material confined between, and in sealing contact with the end wall 16 of the vat and the adjacent side wall of the vacuum box. Because of this sealing arrangement, the vacuum box may be turned about the supporting trunnion 12, with the annular sealing member 39 then simply sliding along the inner face of the end wall 16 of the vat.

Figure 2:
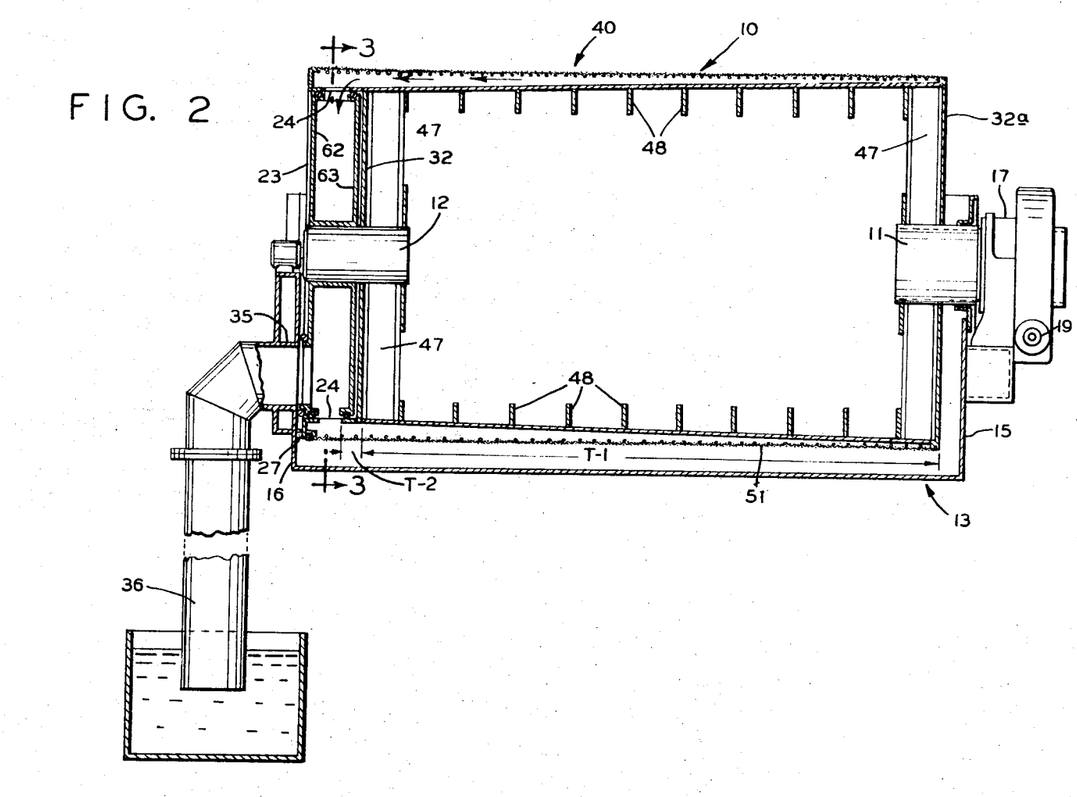
FIG. 2 is a longitudinal sectional view of the filter unit, taken on line 2—2 in FIG. 1, and showing a barometric leg filtrate discharge connection for the vacuum box.
Figure 8:
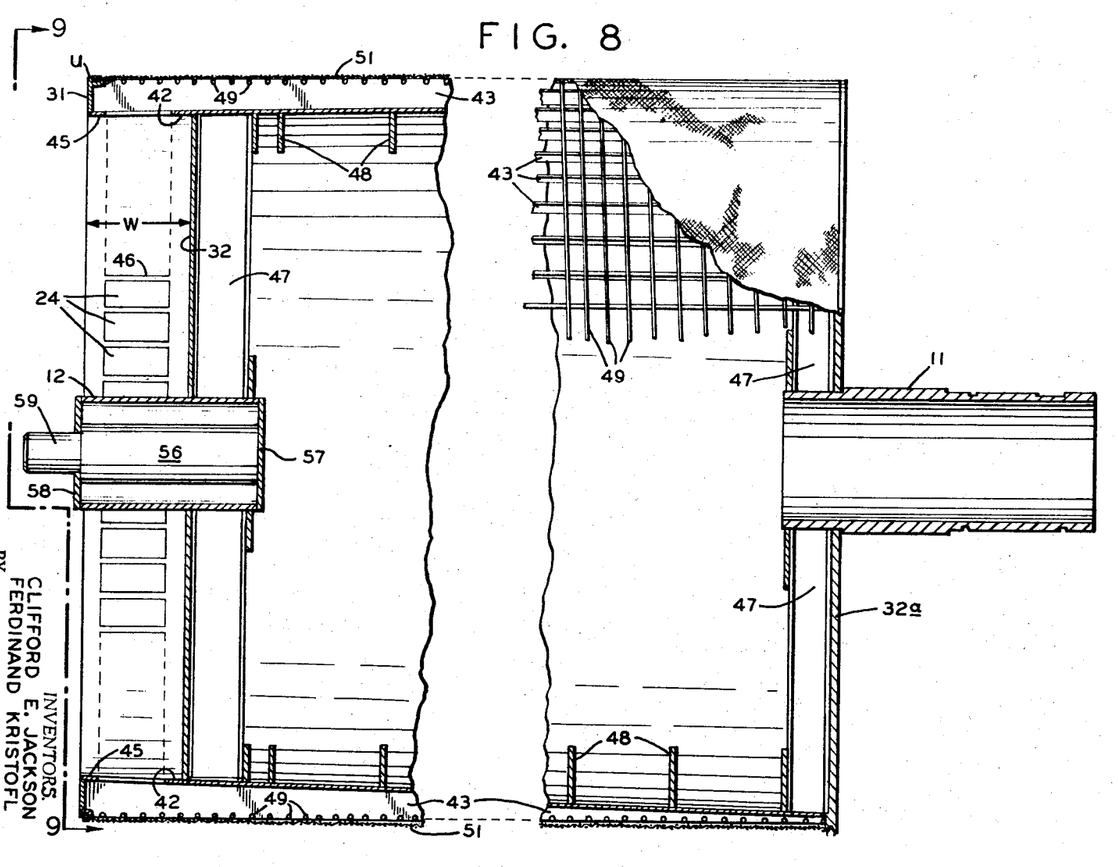
FIG. 8 is an enlarged longitudianal part-sectional view of the filter drum detached from the filter unit in FIG. 2.
Figure 9:
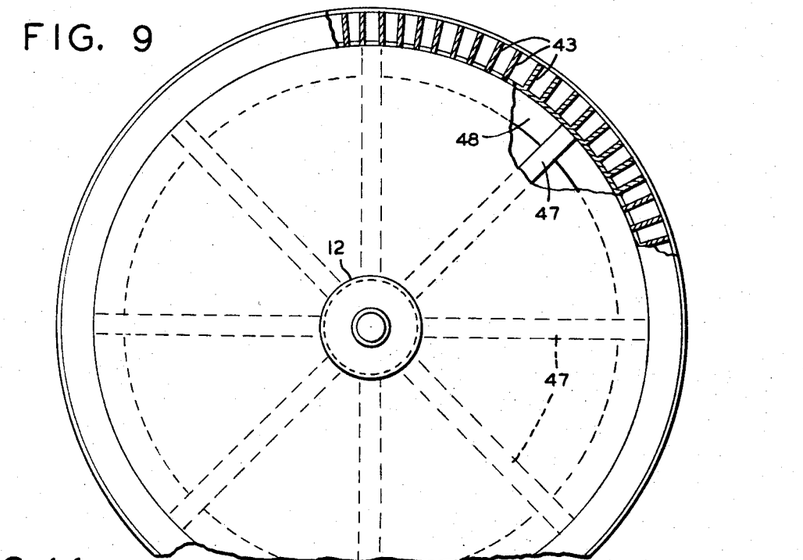
FIG. 9 is an end view of the detached filter drum, taken on line 9—9 in FIG. 8, with portions broken away to expose some of the interior.

The filter drum briefly outlined above in a preferred embodiment comprises in more detail a drum element or shell 40 (see FIG. 2) having a tapered body portion of the length T-1 closed at the narrow end by the aforementioned head plate 32 and closed at the wide end by a head plate 32a. From the narrow end of the tapered portion extends a short cylindrical portion T-2 providing a first internal narrow cylindrical sealing surface 42 (see FIG. 8). Rib elements 43 in the form of tapered plates extend outwardly spaced around the drum element, to constitute axially directed drainage channels 44 adjoining one another, and increasing in depth in proportion to the taper of the body portion T-1.

The rib elements protrude a distance beyond the narrow end of the drum element or shell, having transverse terminal edges connected or welded to an annular terminal number U which may be of U-shaped cross-sectional configuration. The U-shape externally provides the aforementioned transverse annular sealing surface 31 engaged by the deckle element 27. This annular terminal member has an inner cylindrical rim portion presenting a second narrow internal cylindrical sealing surface 45 (see FIG. 8) constituting a companion sealing surface to the first mentioned similar sealing surface 42. Both cylindrical companion sealing surfaces 42 and 45 in turn constitute with the adjacent inner edge portions 46 (see FIG. 8) of the rib elements a common cylindrical sealing surface of the width W (see FIG. 8) interrupted by the aforementioned filtrate drainage openings 24. This common surface is in sealing contact with the edges of the arcuate suction opening of the vacuum box, thus providing suction effect for the drainage openings 24 in the aforementioned vacuum operating zones.

The trunnions 11 and 12 are fixed in the head plates 32a and 32 respectively of the filter drum. At the inner face each of these head plates is strengthened by structural members 47 extending radially from the trunnions to the drum element which is furthermore strengthened by internal annular ribs 48 extending in transverse planes spaced along the drum axis.

A wire 49 spirally wound around and fixed upon the drum structure is supported in notches 50 formed in the outer longitudinal edges of the rib elements, the spacing and arrangement of the notches defining the pitch of the wire windings. The wire in turn, together with the rib plates constitute a supporting grid for filter media 51 tightly wound around this grid. The terminal edges of the filter media are secured to the respective ends of the drum structure in the manner indicated at 52 and 53 respectively (see FIGS. 7a and 7b), thus covering the filtrate drainage channels 44 from end to end thereof.

Referring to FIGS. 2, 7a, 7b, and 8, the trunnion 11 at the rear or driven end of the filter drum is in the form of a tubular member extending through the rear end wall 15 of the vat. This trunnion being located below the pulp level L in the vat, has sealed relationship with the wall as through a stuffing box 54. The trunnion 12 at the front end or filtrate drainage end of the filter drum may be of a composite construction (see FIG. 7a) in that it comprises a cylindrical member 55 and concentrically fixed therein a solid trunnion member 56 of smaller diameter. The member 56 is fixed in end plates 57 and 58 closing the ends of member 55, thus constituting a rigid trunnion unit. A somewhat reduced outer projecting end portion 59 of member 56 is carried in the front end trunnion bearing 18. The vacuum box 23 is carried and centered by the member 55 of this trunnion unit. A detachable retainer ring 58a holds the vacuum box in place on member 55.

Figures 7A, 7C:
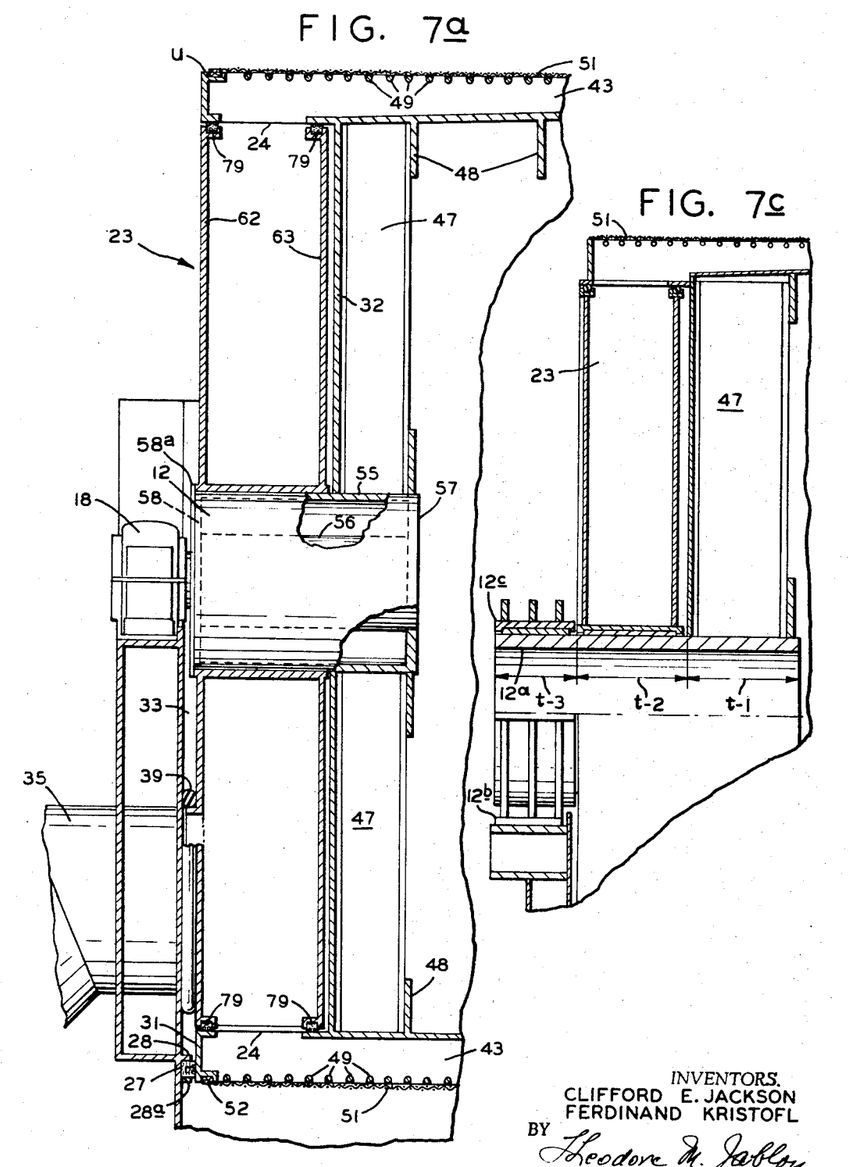
Figure 7B:
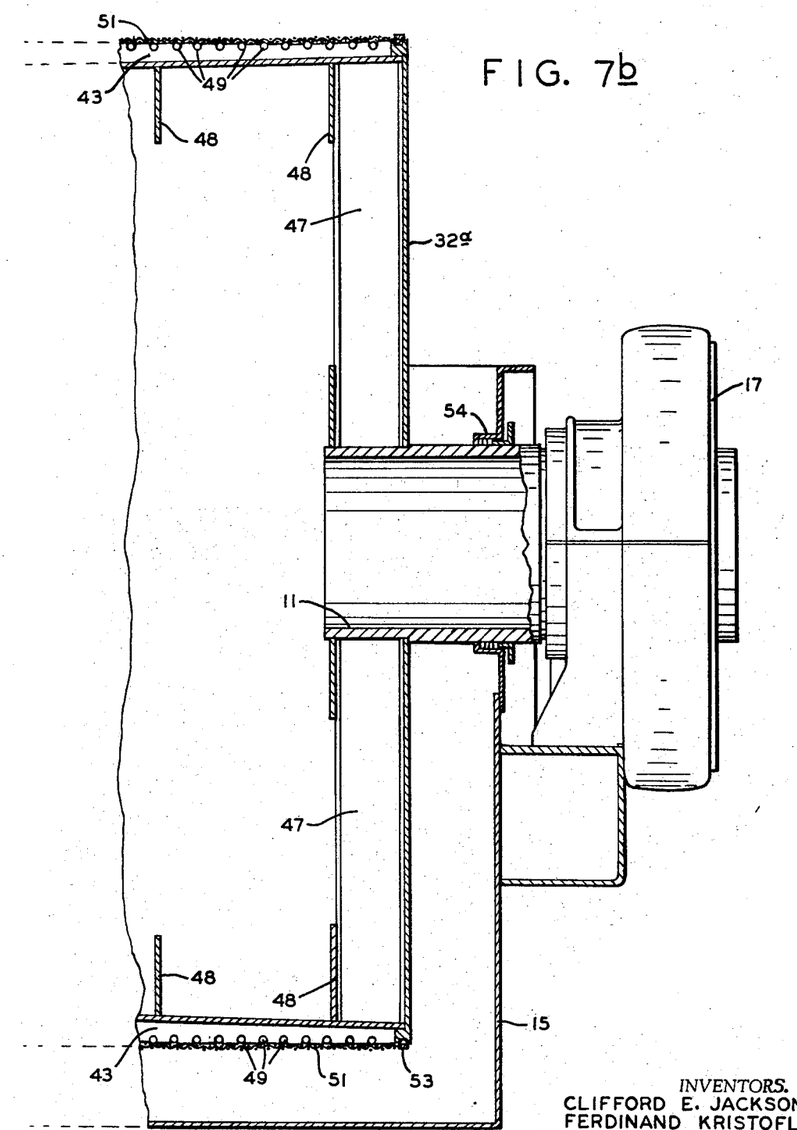

According to detail FIG. 7c, the trunnion mounting at the filtrate discharge end of the filter drum differs from the one in FIG. 7a, in that it comprises a cylindrical trunnion member 12a of uniform outside diameter. The total length of this trunnion member comprises an inner end portion t-1 rigidly connected to the filter drum, an intermediate portion t-2 supporting the vacuum box, and an outer end portion t-3 carried in a trunnion bearing 12b. When the upper half 12c of this bearing is removed, it leaves the vacuum box free to be slid thereon outwardly clear of the filter drum, after rotating the box to the proper position for clearing the end wall of the vat. Similarly, the vacuum box may be mounted on the trunnion conveniently by the reverse procedure.

Figures 10, 11, 12, 13:
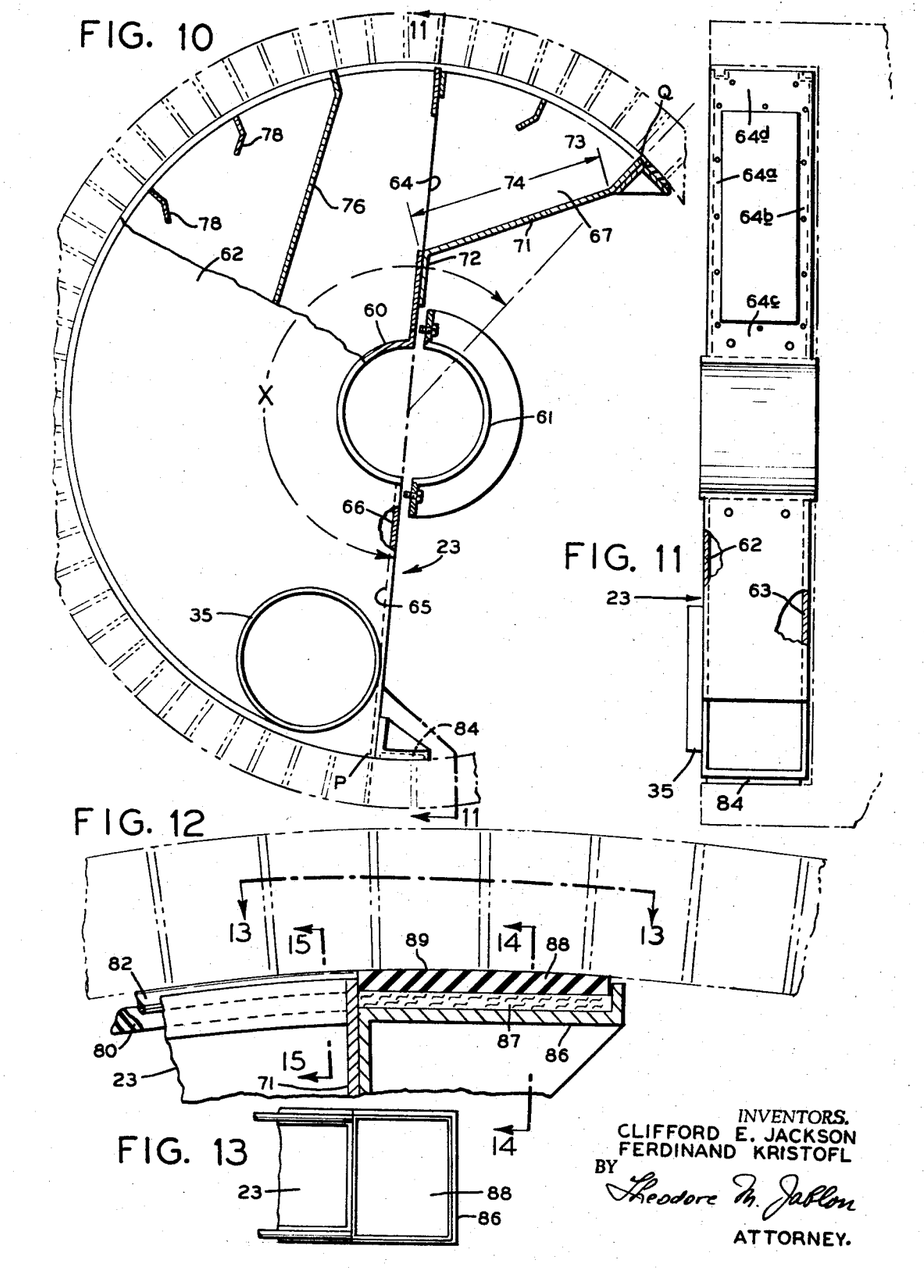
FIG. 10 is an enlarged detail view of the vacuum box detached, with a wall portion broken away.
FIG. 11 is a sectional view of the vacuum box taken on line 11—11 in FIG. 10.
FIG. 12 is an enlarged part-sectional detail view of the upper end corner portions of the vacuum box of FIG. 10, illustrating particularly a sealing pad arrangement at that corner.
FIG. 13 is a top view, in reduced scale, taken on line 13—13 in FIG. 12.
Figure 14:
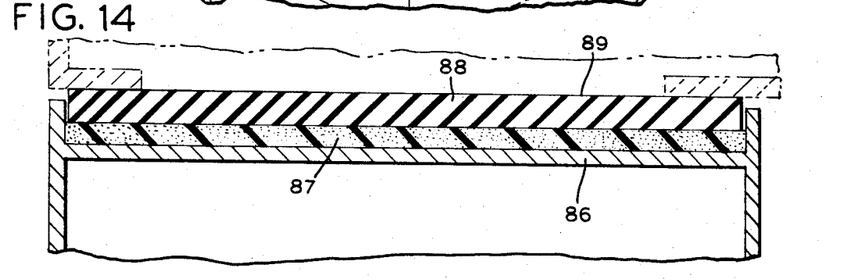
FIG. 14 is a cross-sectional detail view of the sealing pad arrangement, taken on line 14—14 in FIG. 12.

The stationary vacuum suction box 23 in the preferred embodiment now to be described in more detail, comprises a split hub portion consisting of two half shells 60 and 61 with flanges thereof bolted together to close around the front end trunnion 12 in sliding or bearing relationship therewith. The vacuum box itself comprises two parallel main side walls 62 and 63. These side walls each represent an angular area corresponding to an arc of 180°, in planes transversal of the drum axis. These side walls are fixed to half shell 60, having upper parallel radial edges 64 and lower parallel radial edges 65, which radial edges substantially coincide with the plane of the split. The lower radial edges 65 are interconnected by an end plate 66. The space between the upper radial edges 64 is closed by an overhanging vacuum box extension 67 detachably connected or bolted to the radial edges of the side walls 62 and 63, with a frame of internal flanges 64a, 64b, 64c, and 64d indicating that connection in FIG. 11. The box extension (see FIG. 10) comprises side walls coplanar with respective main side walls 62 and 63, respectively, and an end wall 71 having radially extending end portions 72 and 73 interconnected by an intermediate overhanging inclined portion 74. The total effective arcuate length of the vacuum box thus extends over an arc X substantially in excess of 180° and also defined by peripheral end points P and Q. The vacuum box is secured against rotation by a bracket member 74a relative to the end wall of the vat (see FIG. 1).

The vacuum box has a lower partial partition wall 75 and an upper partial partition wall 76, functionally dividing the box into a lower receiving compartment 77 collecting filtrate from a vacuum filtration zone Z-1, an intermediate receiving compartment 77a collecting wash liquid from a spray washing zone Z-2, and an upper receiving compartment 77b collecting wash liquid from a drainage or drying zone Z-3. All three zones being subjected to vacuum effects of various degrees have their respective liquids discharge via the aforementioned vacuum filtrate conduit means 35 and through the barometrc leg communicating with the low end of the vacuum box adjacent to the bottom or 6 o'clock position of the filter drum. The vacuum box has transverse reinforcing members 78 spaced along the arcuate suction opening of the box, and shaped to serve also as deflector baffles for the liquids entering the respective receiving compartments of the vacuum box.

The vacuum box itself while peripherally conforming to the cylindrical curvature of the surrounding filter drum, has radially slightly spaced relationship therewith. However, the arcuate clearance between the parts is closed by the provision of resilient sealing means upon and along the edges of the arcuate suction opening of the vacuum box. The sealing means resiliently engage the surrounding cylindrical sealing surface of the filter drum, insuring vacuum communication with filtrate drainage openings 24 therein.

To accommodate the sealing means, the arcuate edges of the side walls of the vacuum box in one embodiment are formed each from end to end thereof with a radially outwardly open groove 79 containing resilient sealing strip material having a linear extent from end to end of the groove.

In one embodiment herein shown the linear sealing strip material comprises a foundation strip 80 of resiliently yieldable or compressible material, for example a porous spongy material such as foam rubber or the like. The yieldable foundation strip herein is of semi-round cross-sectional profile. Upon this foundation strip are placed a pair of parallel wearing strips 82 consisting of a tough flexible material. The wearing strips are of round cross-section and are seated or impressed into the respective resiliently yielding sides of the convex face of the foundation strip, while confined by the respective sides of the containing groove.

Figures 1, 4, 15A:
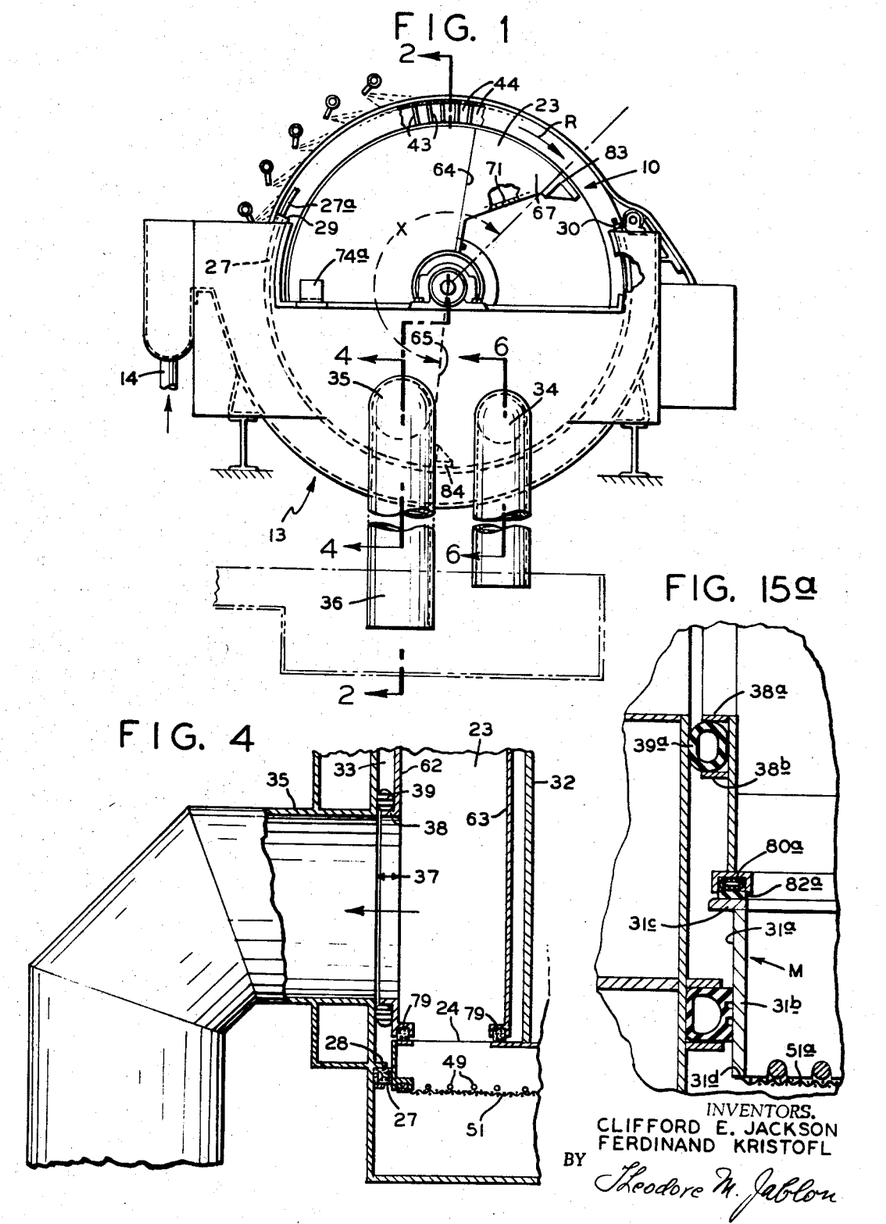
FIG. 1 is an end view upon the filtrate discharge end of the filter unit of this invention, providing an initial gravity filtration zone and featuring a specially mounted vacuum suction box communicating with a vacuum filtration zone following the gravity filtration zone, with a vacuum washing zone and with a vacuum drainage or drying zone, and showing filtrate drainage channels on the filter drum.
FIG. 4 is an enlarged part-sectional view taken on line 4—4 in FIG. 1, particularly showing barometric leg filtrate discharge means for the vacuum box.
FIG. 15a shows another embodiment of the arcuate edge sealing means for the vacuum box.
Figure 15:
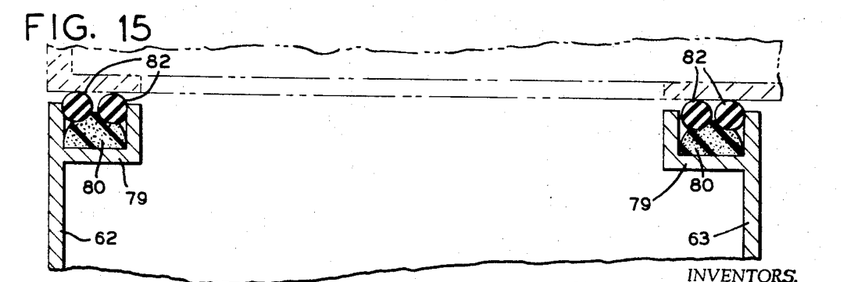
FIG. 15 is a cross-sectional detail view taken on line 15—15 in FIG. 12, of linear sealing means provided along the arcuate edges of the vacuum box.

According to the detail FIG. 15c, the construction of the resilient sealing means along the arcuate edges of the vacuum box differs from the embodiment in FIG. 15 in that they comprise an inflated tube 80a of flexible material providing the resiliently yieldable foundation upon which is placed a flexible wearing strip 82a of Teflon or the like. This permits changing the sealing means without necessarily removing the vacuum box, preferably after deflating the tubes, although the vacuum box may be moved to an exposed position in the manner described above in connection with detail FIG. 7c. FIG. 15a also shows a hollow O-ring seal element 39a confined between rim portions 38a and 38b. This furthermore shows a terminal annular face member M of the filter drum providing the sealing contact face 31a for the adjacent deckle sealing element. In this embodiment the member M is L-shaped in cross-section, comprising a flat body portion 31b in a plane transversely of the drum axis, and an outwardly extending cylindrical portion 31c having an inner cylindrical sealing surface in sealing contact with the wearing strip 82a on the vacuum box. The filter media which may be in the form of wire mesh or so-called deck wire 51a is wrapped tightly over the backing wire of the filter drum, and may have its peripheral terminal edges silver-soldered to the peripheral edge face 31d of member M.

The short or transverse straight sides of the arcuate suction opening O are provided with a sealing pad having a sealing surface curved to conform and cooperate with the surrounding cylindrical sealing surface of the filter drum. These sealing pads extend from the ends of the above described arcuately extending sealing strips, and are dimensioned to provide an adequate intervening blank-off zone between respective operating zones of the filter drum. A sealing pad 83 at the upper end corner of the vacuum box provides a blank-off zone B-1 between drying zone Z-3 and a vacuum break and sheet discharge zone S. Another sealing pad 84 at the lower corner of the vacuum box provides a blank-off zone B-2 between a gravity filtration zone G and the vacuum filtration zone Z-1. An intermediate sealing pad 85 provides a blank-off zone B-3 between vacuum filtration zone Z-1 and spray washing zone Z-2. As most clearly illustrated in the enlarged sectional detail of FIG. 12, as well as in the small scale plan view FIG. 13 derived therefrom, the mounting of the sealing pads or sealing shoes at the ends of the arcuate suction opening comprises bracket or tray member 86 fastened to the respective end wall 71 of the vacuum box. The sealing pad being supported and held against displacement on the tray member comprises a resiliently yieldable foundation pad 87 consisting of the same or similar relatively soft resiliently yieldable or compressible material as the aforementioned linear foundation strips 80.

A wear plate 88 consisting of a suitable wear material which may be semi-hard, is resiliently supported by the foundation pad, and is formed with an outer curved surface 89 conforming to and resiliently held against the cylindrical curvature of the surrounding cylindrical sealing surface of the filter drum.

Figure 3:
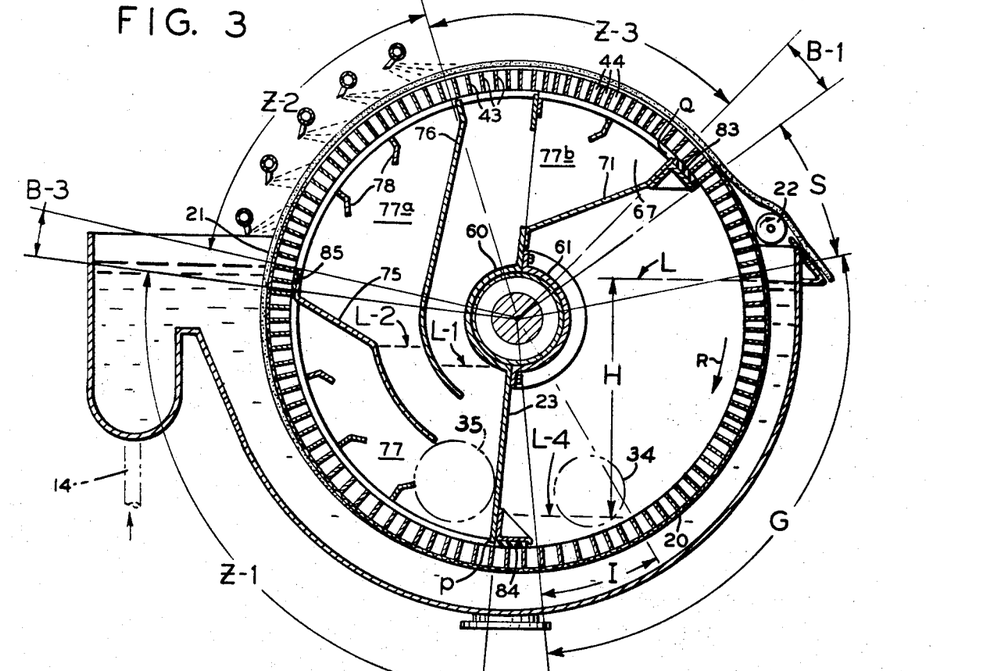
FIG. 3 is a transverse section of the filter unit, taken on line 3—3 in FIG. 2, showing the interior of the vacuum box communicating with the drainage channels on the filter drum.
Figure 5:
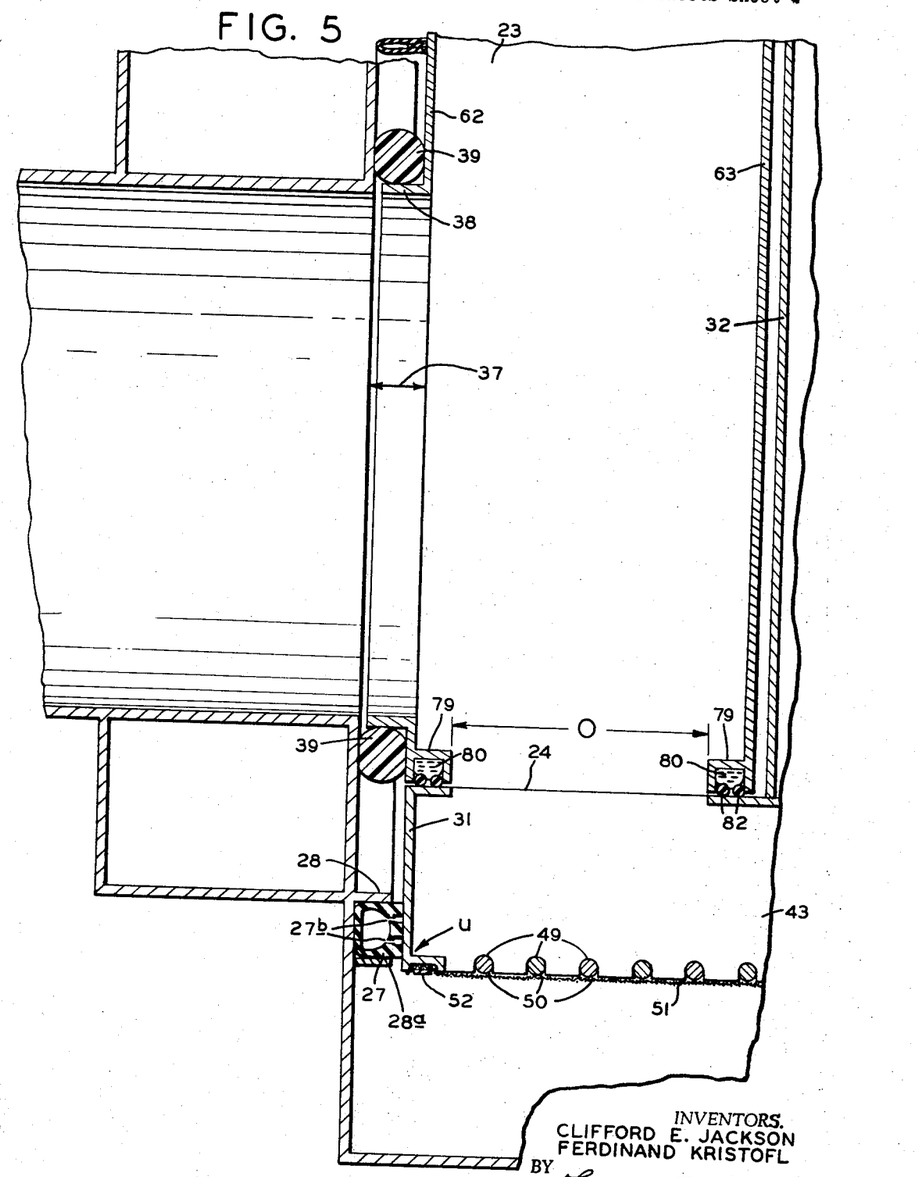
FIG. 5 is a further enlarged view taken from FIG. 4, showing more clearly various sealing means required between the parts.
Figure 6:
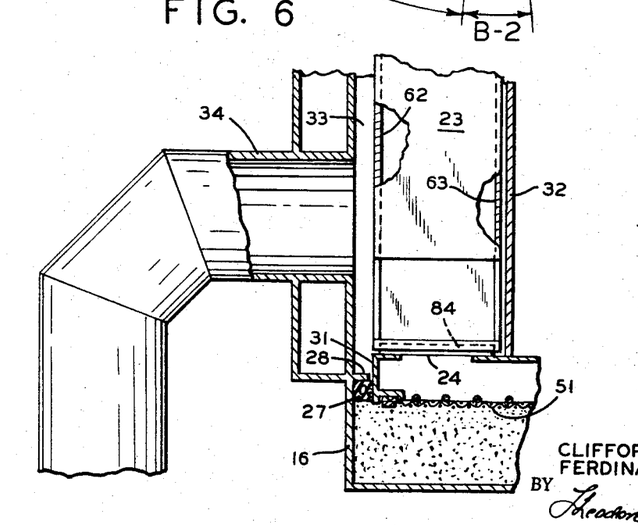
FIG. 6 is an enlarged part-sectional view taken on line 6—6 in FIG. 1, particularly showing the gravity filtrate discharge connection.

The operation of the filter unit will be clear from the filter operating cycle graphically shown in FIG. 3, and described as follows:

As the filter drum rotates in the clockwise direction of arrow R. the descending side thereof is first subjected to gravity filtration in what is herein generally designated as the gravity filtration zone G effective as such due to the differential H between the pulp level L in the vat and the filtrate level L-4 in the upwardly open filtrate receiving space 33. Accordingly, the zone G includes a relatively small lower end portion I where the respective filtrate drainage openings are submerged, and the respective associated drainage channels 44 on the filter drum are thus kept full of filtrate liquid and devoid of air. Gravity filtrate thus discharges from the receiving space 33 through discharge conduit 34, while an initial layer of fibrous pulp material collects relatively loosely and permeably upon the filter media in that zone.

The filter drum with the drainage channels 44 full of liquid then passes through the blank-off zone B-2 at the 6 o'clock position into the vacuum filtrate zone Z-1 at the ascending side of the drum. This zone Z-1 is limited upwardly by the location of pulp level L, and is associated with the lower filtrate receiving compartment 77 in the vacuum box 23. In operation this compartment is filled with filtrate liquid due to the vacuum effect of the barometric leg 36, while additional layers of pulp material build up upon the pervious layer initially formed. A sheet of substantial total thickness is thus built up effectively because of the permeability provided by the initial or basic layer, which also discourages blinding of the filter media during sheet formation, resulting in efficient high capacity operation of the filter unit.

The resulting sheet thickness emerging from the pulp bath with the rotation of the drum, then moves through the intermediate blank-off zone B-3 into the spray washing zone Z-2 where residual pulp liquor and chemicals are washed out of the sheet, the washing effect being facilitated and rendered more effective due to the initially formed gravity filtration layer of the sheet.

The wash spray devices for this washing zone are designed and operated so as to maintain upon the pulp sheet sufficient wash liquid throughout the area of that zone to help sustain in the receiving compartment 77a a vacuum sufficient to maintain therein a liquid level L-2. The pulp sheet containing residual wash liquid then moves from the washing zone past the upper partition 76 into the drying zone Z-3 where the pulp sheet under the effect of vacuum becomes somewhat compacted as residual liquid is drawn therefrom into the topmost compartment 77b of the vacuum box, with a liquid level L-1 thus being maintainable in that compartment. Thus, the liquid from all three vacuum-operated compartments 77, 77a, and 77b may be delivered jointly through the barometric leg. Further rotation of the drum moves the thus dried sheet through the last blank-off zone B-1 and, after breaking the vacuum, into the sheet discharge zone S where pulp sheet is detached from the filter media and delivered from the drum as shown, whereupon the foregoing filter operating cycle starts anew. At variance with the embodiment shown, the sealing pad 84 with its supporting bracket (see FIG. 3)

and thus the blank-off zone B-2 may be omitted while having the end wall 23 terminate close to the inner cylindrical sealing surface of the filter drum, substantially in the manner of partition 76. The filtrate in the receiving space 33 (level L-4) then forms an effective automatic non-wearing liquid seal at the lower corner of the vacuum box. The elevation of the gravity filtrate discharge is located so as to provide optimum automatic liquid seal, as well as maximum available static head H.

Any possible leak of filtrate from the vacuum box or from the vat past the deckle strap device into the receiving space 33 is drained away through the gravity filtrate outlet 35, providing clean and splash free operation.

Features and advantages of the vacuum box constructed and arranged according to this invention, are that the assembly is accurately centered by the trunnion relative to the filter drum; that the vacuum box is angularly adjustable about the trunnion, readily accessible, and readily mountable and dismountable; that by simple structural changes it allows for making variations in the filter operating cycle; and that the arrangement is immune to dislocation of the parts relative to one another due to thermal expansion effects, which effects are absorbed by the edge-sealing means of the vacuum box. At the same time, since the vacuum box is supported by the trunnion of the filter drum, frictional drag due to external atmospheric pressure upon the vacuum box is compensated for or eliminated, so that driving power requirements as well as wear and tear in the operation of the filter unit are minimized.

Another highly practical advantage is due to the fact that the resistance to the flow of filtrate through the filter unit is minimized, since the liquid passes steadily falling in a freely cascading manner aided by the slope of the drainage channels 44 from the drainage channels to the two discharge outlets leading from the end wall of the vat, which outlets in turn are located at the lowest practical point of the filter drum. Therefore, with the unrestricted freedom of flow only a relatively short barometric filtrate discharge leg may be needed to satisfy the sheet-forming requirements. Similarly, the cost of providing and operating other vacuum producing equipment for the vacuum box will be minimized.

Vacuum gauges (not shown) may be connected to the respective vacuum chambers 77, 77a, and 77b of the vacuum box. Gauge means may also be provided (not shown) for determining the liquid levels L-1 and L-2 maintainable in these compartments.

While the above described vacuum box is well suited for the purpose herein set forth in connection with a preferred embodiment of the filter unit herein shown, it may be readily adapted to changes in the operation or filtration cycle, without loss of the various basic structural and functional advantages of the vacuum box, above set forth. For example, a second vacuum box extension similar to the one herein shown at the top, may also be added to the lower end of the vacuum box, thereby extending the effective peripheral length of the vacuum box over an arc of about 270°. Another possibility is to convert the half shell 61 of the hub portion into additional vacuum box volume, so that the resulting vacuum box as a whole would consist of two halves, extending peripherally over an arc of 360°.

The filter unit as a whole, in another embodiment for further increased capacity, may comprise a vacuum box arrangement such as that one herein shown, at each end of the filter drum, with the drum element or drum shell tapered down from the middle towards both filtrate discharging ends.

In summary, the invention provides an improved pulp filter featuring the combination of an initial gravity filtration phase with subsequent filtration, washing, and drying phases, together with free downward or "cascade" flow of the filtrates all the way from the sloping filtrate channels of the filter drum to the low level filtrate discharge connections leading from the vat. The filter unit thus attains higher capacity, improved pervious sheet formation, efficient drainage with higher chemical recovery in the filtrate and the wash, and eventually a drier well-washed sheet, achieveable even with the use of a relatively short barometric leg.

The improved vacuum box arrangement with special peripherally effective seals, located within the filtrate discharge end of the filter drum, provides ready accessibility to the main component part of the filter unit, minimum frictional seal resistance, and hence a minimum of wear and tear, maintenance, and power requirements. This vacuum box arrangement also provides a high degree of flexibility with respect to adapting the operation of the filter unit for various purposes involving modifications of the filtration cycle. Yet, the construction of the vacuum box is of great simplicity, featuring internal partitioning means defining sequential effective vacuum chambers preferably delivering into a single barometric leg or its vacuum producing equivalent.

In the gravity filtration zone, the difference between the pulp level in the vat and the filtrate level in the discharge end of the filter drum is utilized to form a very loose pulp sheet wherein the fibers are laid down in such a manner as to form a homogeneous and porous layer, resulting in more rapid drainage, higher capacity and final sheet thickness, more effective washing, and finally a drier sheet discharging past the vacuum-break shoe at the end of the vacuum box.

The main components parts controlling the operation of the filter unit are located substantially in full view and easily accessible, so the condition of the seals and the operation of the vacuum box may be readily observed and checked. When the vacuum box is in place, it is kept effective by its peripheral seals, as well as by the annular sealing element effective between the vacuum box and the adjoining end of the wall.

The peripheral seals of the vacuum box are self-adjusting, capable of taking up thermal expansion and/or manufacturing inaccuracies. The atmospheric pressure acting upon the exterior of the vacuum box is radial and therefore is absorbed by the trunnions of the filter drum. This leaves the peripheral seals free to adjust themselves, minimizing wear and tear and power requirements, so there is no seizure or galling between the contact surfaces.

Attachable sectors can be added to the basic vacuum box, or the vacuum box can be replaced by another one of different sector size. Furthermore, the vacuum-break shoe at the upper end of the vacuum box with sealing pad is readily accessible and exchangeable without removing the vacuum box itself.

The filter unit is usable as a Board-Former by extending the effective length of the vacuum box to encompass 270° or even 360°, but at the other extreme may also be operated as a straight gravity filter or "valve-less" filter after removal of the vacuum box.

From the foregoing description of the various embodiments of this invention it is evident that the objects of this invention, together with many practical advantages, are successfully achieved. While the preferred embodiments of our invention have been described, numerous modifications may be made without departing from the scope of the invention as defined by the appended claims.

Therefore, it is to be understood that all matter herein set forth and as shown in the accompanying drawings are to be interpreted in an illustrative and not in a limiting sense.

We claim:

1. A continuous rotary drum filter which comprises a vat adapted to contain a suspension of solids to be filtered, having transverse end walls one of which has a filtrate discharge opening and a vacuum filtrate discharge conduit means connected thereto; a filter drum mounted for rotation on said vat, so as to be partially immersed in said suspension, said filter drum comprising a drum structure provided with trunnions mounted in bearings on respective transverse end walls of the vat, said drum structure being formed outwardly with axially directed filtrate drainage channels adjoining one another, and having at one end adjacent to said one transverse end wall radially inwardly directed drainage openings located in a common internal cylindrical sealing surface coaxial with the drum axis, and filter media surrounding said drum structure and closing said drainage channels;

a stationary vacuum box having an inner sidewall and an outer side wall opposite each other extending transversely of the drum axis, and having arcuate edge portions conforming to the curvature of the internal sealing surface, and also having end walls with complementary edge portions between respective ends of said arcuate edge portions, and constituting therewith an arcuate suction opening substantially conforming to the curvature of said internal cylindrical sealing surface, and communicating with a predetermined number of said inwardly directed drainage openings, said arcuate suction opening having sealing means provided along the edges for sealingly engaging said cylindrical sealing surface to maintain vacuum suction for said number of drainage openings during rotation of the drum structure in a vacuum filtration zone, said outer side wall of the box having a flow passage opening substantially registering with said discharge opening in said one end wall of the vat, and located substantially below and eccentrically of the adjacent trunnion, annular sealing means interposed between said outer side wall and said end wall in a plane transversely of the drum axis and surrounding the filtrate through flow area of said flow passage and filtrate discharge openings, and providing filtrate flow connection from said vacuum box to said vacuum discharge conduit means, and means for supporting said vacuum box so as to maintain said arcuate suction opening thereof concentric with the drum axis, and in cooperative relationship with the filter drum with said vacuum box exposed to atmospheric pressure externally from both sides.

2. The drum filter according to claim 1, wherein said vacuum box has a hub portion surrounding and engaging the adjacent trunnion concentric therewith, said trunnion through said hub portion being adapted to absorb atmospheric pressure force acting radially outwardly upon said box when in operation.

3. The drum filter according to claim 2, wherein said hub portion comprises two half shells disconnectably connected to one another, wherein said vacuum box comprises a body portion extending transversely of the filter axis over an arc of 180°, having a pair of side walls fixed to one of said half shells so that the radial terminal edges of said side walls substantially coincide with the plane of split of said hub portion, said plane extending in a substantially vertical direction, and having a transverse end wall interconnecting the lower radial terminal edges of said side walls, and having upper wall means interconnecting the upper radial terminal edges of said side walls.

4. The drum filter according to claim 3, wherein said upper wall means of the vacuum box comprise an arcuate vacuum box extension providing an arcuate suction opening in excess of 180°.

5. The drum filter according to claim 1, wherein said vacuum filtration zone is located substantially at the lower portion of the ascending side of the filter drum, and wherein said one end wall of the vat has a further filtrate discharge means for delivery of filtrate liquid from a gravity filtration zone preceding said vacuum filtration zone at the lower portion of the descending side of the filter drum, with the addition of blocking means associated with the filter drum and constructed and arranged to prevent said suspension in the vat from passing through the drum and mingling with the filtrate liquid from said gravity filtration zone, and deckle strap sealing means are provided adjacent to said drainage openings, and sealingly effective between said one end wall of the vat and the adjacent end of the drum structure to separate the suspension in the vat from gravity filtration liquid.

6. The drum filter according to claim 5, wherein said drum structure comprises a hollow drum element one end of which provides a first internal cylindrical narrow sealing surface, radial ribs extending outwardly from said drum element to constitute said filtrate drainage channels, said ribs extending the length of said drum element and protruding beyond said first narrow internal sealing surface, an annular element concentric with the drum axis and fixed to the transverse terminal edges of the protruding portions of said ribs so as to constitute therewith said radially inwardly directed drainage openings, said annular element having a flat body portion providing an outer annular sealing surface in a plane extending transversely of the drum axis, and cooperating with said deckle strap sealing means, and having an outer rim portion providing a backing for fastening the adjoining terminal portion of said filter media, and having an inner rim portion providing an internal narrow cylindrical sealing surface, both said first and second narrow internal cylindrical sealing surfaces together with the inner longitudinal edges of said protruding portion of the ribs defining a common cylindrical surface.

7. The drum filter according to claim 5, wherein said blocking means comprise a transverse wall provided internally of the filter drum.

8. The drum filter according to claim 1, wherein said vacuum filtration zone is located substantially at the lower portion of the ascending side of the filter drum, and wherein said one end wall of the vat has a gravity filtrate discharge means for delivery of filtrate liquid from a gravity filtration zone preceding said vacuum filtration zone at the lower portion of the descending side of the filter drum, and wherein said vacuum filtrate discharge conduit and said gravity filtrate discharge means are located adjacent to one another and adjacent to the bottom of said drum, with the addition of blocking means associated with the filter drum and constructed and arranged to prevent said suspension in the vat from passing through the drum and mingling with the filtrate liquid from said gravity filtration zone, and deckle strap sealing means are provided adjacent to said drainage openings and sealingly effective between said one end wall of the vat and the adjacent end of the drum structure to separate the suspension in the vat from gravity filtration liquid.

9. The drum filter according to claim 8, wherein said blocking means comprise a transverse wall provided internally of the filter drum.

10. The drum filter according to claim 1, wherein said vacuum box has a lower portion providing the vacuum for the vacuum filtration zone, and an upper portion providing vacuum for a subsequent cake washing and drying zone.

11. The drum filter according to claim 10, wherein said vacuum box has partition means functionally dividing the box into a first receiving chamber for vacuum filtrate, a second receiving chamber for spent wash liquid, and a third receiving chamber for residual spent wash liquid.

12. The drum filter according to claim 1, wherein the arcuate suction opening of the vacuum box extends substantially from the bottom of the filter drum along the ascending side thereof to a point past the top of the filter drum.

13. The drum filter according to claim 1, wherein said annular sealing means comprise a ring member of resilient material, and retaining means for maintaining said ring member positioned around said filtrate throughflow area.

14. The drum filter according to claim 1, wherein said vacuum filtrate discharge conduit means comprise a neck extending outwardly from said submerged opening, and said annular sealing means comprise a ring member of resilient material seated around said neck portion.

15. The drum filter according to claim 1, wherein said sealing means along the edges of the arcuate suction opening comprise a foundation of resiliently yieldable cushioning material, and a flexible wear strip material thereon engaging the curvature of the surrounding cylindrical sealing surface of the drum.

16. The drum filter according to claim 15, wherein said foundation is in the nature of a porous material.

17. The drum filter according to claim 1, wherein the arcuate edges of said suction opening are in the form of grooves open towards the surrounding cylindrical internal sealing surface of the drum structure, wherein each of the transverse terminal edges of said suction opening is formed with a tray extending outwardly from the respective ends of said grooves, wherein said sealing means extend in said grooves from end to end thereof, and wherein sealing pad means are located in each said tray so that each tray provides a neutral zone.

18. The drum filter according to claim 17, wherein said sealing means in the grooves comprise a foundation of resiliently yieldable cushioning material, and a wear strip thereon consisting of a tough flexible wear-resisting material, and wherein said sealing pad means comprise a foundation pad of resiliently yieldable cushioning material and a wear plate on said yieldable foundation pad conforming to the curvature of said inner cylindrical sealing surface of the drum structure.

19. The drum filter according to claim 17, wherein said sealing means in the grooves comprise a resiliently yieldable cushioning material, and a pair of flexible parallel wear strips thereon of round cross-section.

20. The drum filter according to claim 17, wherein said sealing means comprise a foundation strip of resiliently yieldable cushioning material and of a cross-sectional profile defined by a base and declining sides, and a pair of parallel flexible wear strips of round cross-section seated on said declining sides.

21. The drum filter according to claim 20, wherein said foundation strip is of half-round profile.

References Cited

UNITED STATES PATENTS

| 2,663,432 | 12/1953 | Johansen | 210—404 |
| 2,894,635 | 7/1959 | Irthum et al. | 210—402 |
| 3,014,589 | 12/1961 | Frykhult | 210—404 X |
| 3,233,736 | 2/1966 | Vernay | 210—404 |

FOREIGN PATENTS

| 452,267 | 11/1948 | Canada. |
| 478,434 | 1/1938 | Great Britain. |

SAMIH N. ZAHARNA, *Primary Examiner.*